H. H. & H. T. HIPWELL.
GREASE GUN.
APPLICATION FILED OCT. 24, 1917.

1,261,933.

Patented Apr. 9, 1918.

H. H. Hipwell
H. T. Hipwell
Inventors by C. A. Snow & Co.
Attorneys

UNITED STATES PATENT OFFICE.

HARRY H. HIPWELL AND HARRY T. HIPWELL, OF PITTSBURGH, PENNSYLVANIA.

GREASE-GUN.

1,261,933.

Specification of Letters Patent.  Patented Apr. 9, 1918.

Application filed October 24, 1917. Serial No. 198,234.

*To all whom it may concern:*

Be it known that we, HARRY H. HIPWELL and HARRY T. HIPWELL, citizens of the United States, residing at N. S. Pittsburgh, in the county of Allegheny, State of Pennsylvania, have invented a new and useful Grease-Gun, of which the following is a specification.

The present invention appertains to a grease or lubricant gun employed for injecting grease, oil or other lubricant into grease cups, bearings, etc., it being the object of the invention to provide a device of that character which can be used in a convenient, practical and efficient manner for either heavy or thick greases, or light oils.

One object of the invention is the provision of a grease gun embodying a barrel or cylinder in which a piston is movable, and novel means whereby the piston can be advanced with considerable pressure by means of screw threads when thick grease is used, and can be slid quickly back and forth when light oil is used. Thus, when considerable pressure is necessary to eject thick grease, a screw-threaded connection between the piston and barrel is provided, and this connection can be broken when light oils are used to permit of the free movement of the piston.

Another object of the invention is the provision of a novel screw-threaded connection between the piston and barrel, including a special screw-threaded construction for the stem of the piston and a special nut for the barrel, which nut can be stamped from sheet metal.

It is also the object of the invention to provide a grease gun having the features above noted, and which at the same time is simple, light and inexpensive in construction, as well as being serviceable and efficient.

With the foregoing and other objects in view, which will appear as the description proceeds, the invention resides in the combination and arrangement of parts and in the details of construction hereinafter described and claimed, it being understood that changes in the precise embodiment of the invention can be made within the scope of what is claimed without departing from the spirit of the invention.

The invention is illustrated in the accompanying drawing, wherein.

Figure 1:
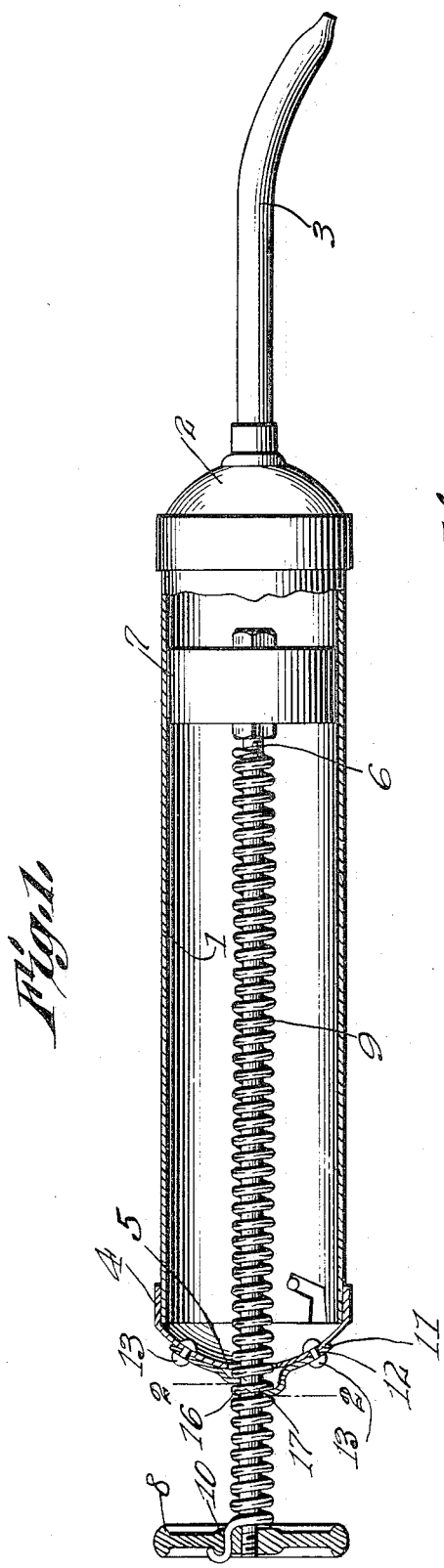
Figure 1 is a view of the grease gun, partly in elevation and partly in longitudinal section.
Figure 3:
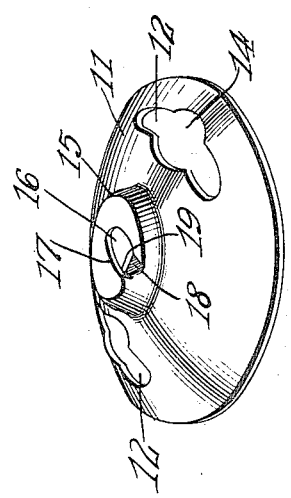
Fig. 3 is a perspective view of the nut.
Figure 2:
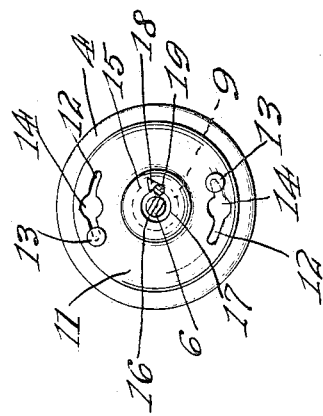
Fig. 2 is a cross section on the line 2—2 of Fig. 1.

The device embodies a barrel or cylinder 1 of suitable size having a cap 2 at one end provided with an outlet nozzle 3 to direct the grease or oil into a lubricant cup, bearing or other part. A cap 4 is fitted on the other end of the barrel and held removably in place in any suitable manner, such as by means of a bayonet slot connection, or the like. The cap 4 has a central aperture or opening 5 through which a stem or rod 6 extends axially within the barrel, said stem being attached to the piston or plunger 7 which moves in the barrel. A suitable handle 8 is attached to the other end of the stem 6 for sliding and rotating it.

In order to provide the stem 6 with screw threads in a simple and inexpensive manner, a helically coiled wire or spring 9 is slipped onto the stem 6, and its outer end is engaged to the handle 8, as at 10, to fasten the spring or coil to the stem so as to rotate therewith. The inner end of the spring can be left free. The spring being slightly resilient can yield longitudinally and transversely of the stem, thus providing a yielding or resilient screw-thread, although the spring is sufficiently stiff to avoid objectionable or unnecessary yielding movement. The spring or coil 9, which can also be denominated the screw thread, passes loosely through the aperture 5, to permit of the sliding movement of the piston and its stem, when the gun is used with light oils or other liquids.

The nut 11 is stamped from sheet metal, thus rendering it inexpensive and compact in construction, and said nut is dished or convexed, as illustrated, to fit snugly against the correspondingly shaped cap or end 4 of the barrel 1 around the aperture 5. The nut 11 and cap 4 are provided with inter-engageable means for the ready attachment and separation thereof. Thus, the nut 11 has arcuate slots 12 curved about its center to engage headed studs 13 outstanding from and secured to the cap 4. The slots 12 have enlargements 14 between their ends for the passage of the heads of the studs 13 in applying the nut 11 and removing it from the cap 4. When the nut is placed against the cap 4, the studs 13 passing through the enlargements 14 of the slots 12, the nut can be turned in either direction so as to engage under the heads of said studs, for holding the nut against the cap 4. By turning the nut back to bring the studs 13 within the enlargements 14 of the slots 12, the nut can readily move away from the cap 4. The nut 11 is provided at its center with an outstruck boss 15 and an aperture 16 centrally of said boss for the passage of the stem 6. The aperture 16 defines a lip 17 surrounding it, and said lip is bent to have a helical form, corresponding with that of the spring or screw thread 9. The lip 17 extends between the convolutions of the spring 9, thus providing a threaded connection between the nut and stem. There is a step or offset 18 between the upper and lower ends of the lip or screw thread 17 of the nut, and the aperture 16 is extended to the step 18, as at 19, for the passage of the spring 9 between the upper and lower ends of said lip 17, providing for the passage of the spring through the nut, with the convolutions bearing against the outer and inner sides of said lip.

When thick greases are used, the nut 11 is attached to the cap or end 4 of the barrel, thus preventing the sliding movement of the piston, and the piston can then be advanced in the barrel with great force by rotating the hand 8. This will eject the grease, and after the grease has been ejected, the nut 11 can be disengaged from the cap 4 and spun to return it near the piston 7. Then after the barrel is again filled, the cap 4 can be attached to the barrel and the nut attached to the cap.

When light oils or other liquids are used, the slow advance of the piston by the threaded connection is undesirable, and the nut is, therefore, disconnected from the cap 4 and screwed on the stem to a point near the handle 8. This permits the stem 6 to slide through the cap 4 for quickly advancing and retracting the piston.

Having thus described the invention, what is claimed as new is:

1. In a device of the class described, a barrel, a piston working therein, a stem extending from the piston, and a longitudinally yieldable, resilient screw thread upon the stem and extended through one end of the barrel.

2. A device of the character described embodying a barrel, a piston therein, a stem for the piston, having a helical coil thereon, and a nut carried by the barrel having a portion extending between the convolutions of said coil.

3. In a device of the character described, a barrel, a piston therein, a stem for the piston, a coil on said stem, and a sheet metal nut attachable to the barrel and having a helical lip extending between the convolutions of said coil.

4. In a device of the character described, a barrel having a cap at one end, a piston in the barrel, a stem for the piston extending through the cap, a coil on said stem providing a screw thread, and a sheet metal nut fitting said cap and having a central outstruck boss apertured and provided with a helical lip extending between the convolutions of said coil, said nut and cap having interengageable means.

In testimony that we claim the foregoing as our own, we have hereto affixed our signatures in the presence of two witnesses.

HARRY H. HIPWELL.
HARRY T. HIPWELL.

Witnesses:
E. M. FAFETTA,
W. Z. HEINSOHN.